Oct. 21, 1924. 1,512,466
W. IFF
METHOD FOR GRINDING PRODUCTS CONTAINING A HIGH PERCENTAGE OF GREASE,
SUCH AS ALMONDS, COFFEE BEANS, CACAO BEANS, AND THE LIKE
Filed May 2, 1921 2 Sheets-Sheet 1

Inventor:
Werner Iff.
By Henry Orth
Atty.

Oct. 21, 1924. 1,512,466
W. IFF
METHOD FOR GRINDING PRODUCTS CONTAINING A HIGH PERCENTAGE OF GREASE,
SUCH AS ALMONDS, COFFEE BEANS, CACAO BEANS, AND THE LIKE
Filed May 2, 1921 2 Sheets-Sheet 2
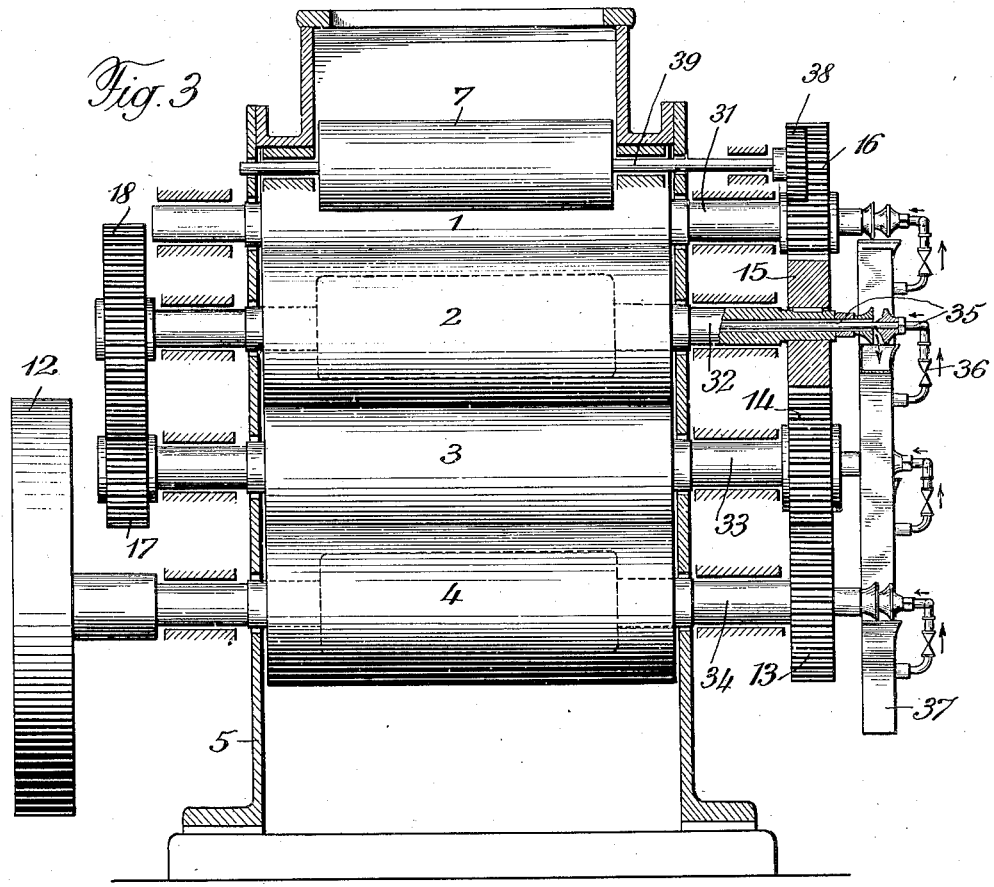
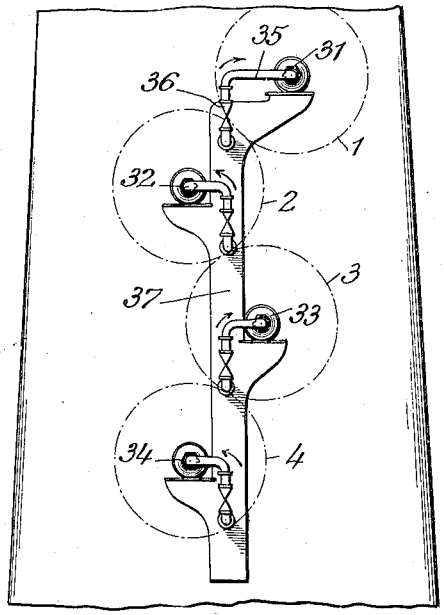

Patented Oct. 21, 1924.

1,512,466

UNITED STATES PATENT OFFICE.

WERNER IFF, OF FLAWIL, SWITZERLAND, ASSIGNOR TO THE FIRM BÜHLER BROTHERS.

METHOD FOR GRINDING PRODUCTS CONTAINING A HIGH PERCENTAGE OF GREASE, SUCH AS ALMONDS, COFFEE BEANS, CACAO BEANS, AND THE LIKE.

Application filed May 2, 1921. Serial No. 466,071.

*To all whom it may concern:*

Be it known that I, WERNER IFF, a citizen of the Republic of Switzerland, residing at Flawil, Switzerland, have invented certain new and useful Improvements in a Method for Grinding Products Containing a High Percentage of Grease, Such as Almonds, Coffee Beans, Cacao Beans, and the like (for which I have filed applications in Switzerland, Mar. 1, 1921, application No. 11,175; Germany, Mar. 14, 1921, application not yet numbered; France, Mar. 26, 1921, application No. 142,124); and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in a method for grinding products containing a high percentage of grease.

It is a well known fact that the grinding of products containing a high percentage of grease, such as almonds, coffee beans, cacao beans and the like presents many difficulties, especially if a high degree of fineness and uniformity is required. The production of a very fine preliminary product for making cacao-powder and chocolate is very tedious and has hitherto been performed with the aid of so-called triplex mills and of melangeurs. Granular cacao has been ground in heated triplex mills in which the melting of the grease and the trituration produced a coarse liquid mass and by the grinding in heated melangeurs (a kind of chat-rollers) a coarse paste was obtained. The cacao mass thus produced serves as a preliminary product for making cacao powder and from the paste chocolate is made. The finer these preliminary products are, the finer is the cacao powder made thereof and the shorter is the process of making a good chocolate.

With these triplex mills and melangeurs the required fineness of the ground product cannot be attained within a reasonable time and furthermore the triplex mills show other serious disadvantages.

Experience has shown that the natural flavour of the cacao is affected in a detrimental manner when grinding cacao in a triplex mill, as sufficient quantity of air can not get into contact with the material between the grinding stones and the influence of the great heat and friction during the grinding process causes the material to be stifled. Another drawback of the triplex mill consists in the great wear of the stones which necessitates a frequent riffling of the latter. If the riffling is not carried out frequently the output of the triplex mill sinks down to an inadmissible minimum in a very short time and a continuous clogging occurs. A further disadvantage consists in the fact that the particles of the worn stone mix with the product to be ground.

Besides these, in a sense primitive methods, trials have been carried out to use only one mill with grinding stones in connection with a grinding cylinder-mill fitted with porcelain cylinders which arrangement was based on the assumption that the flavour of the product would be less affected in a single stone mill and yet the disintegration would be carried out in this stone mill to such a degree of fineness that the smooth porcelain rollers of the subsequent grinding cylinder-mill would be able to grip the product. However, the flavour has been influenced by the passage of the material through the single mill, the wear of the porcelain rollers was very considerable and the fineness of the product obtained was not very high, as porcelain rollers can not be strongly pressed against each other owing to the fragility of the porcelain rollers. This method presents therefore great disadvantages and the product obtained thereby contains as impurities not only stone particles but also porcelain dust.

The object of the present invention is a method which avoids the drawbacks inherent to the triplex mill and also the above mentioned disadvantages of the combination of a stone mill and a porcelain cylinder mill and which method further avoids the long duration of the grinding and the the insufficient fineness of the product obtained in the melangeurs. According to the new method granular products containing a high percentage of grease can be ground in a very short time to a degree of fineness which has not been attained by the hitherto known methods, the flavour of the product being in no way affected.

The present method consists in disintegrating the beans or kernels containing a high percentage of grease in a cold state in a preliminary disintegrator so that they can be gripped by a pair of grinding rollers. This pair of rollers is provided with a suitable grinding surface that does not wear out quickly, for instance of chilled castings or steel, the surface may be fluted if desired and the circumferential speeds of the rollers are chosen such that an effective grinding of the material is attained. These rollers must be adapted to be kept at suitable temperatures in order to provide for a temperature of the product, at which the grease gets soft and flakes of the material that are as thin as possible must be obtained by the first passage of the material between these rollers. In order to liquefy the flakes or grains produced in this manner one or more pairs of rollers, which may also be kept at suitable temperatures, are provided after said first pair of rollers. These rollers are driven at suitable circumferential speeds so that a grinding action of one roller on the other is obtained.

When this method is applied to cacao beans for producing a preliminary product in the manufacture of cacao powder and chocolate, it is sufficient to cause the beans to pass three or four grinding stages, but a greater or smaller number of such passages may be employed according to the percentage of grease contained in the beans and to other qualities of the product to be ground. In accordance with the size of the parts of the product to be ground the latter has to be more or less subjected to the preliminary disintegration. If a pair of smooth rollers cannot grip larger beans, containing a high percentage of grease, such as cacao beans, almonds and the like, suitable apparatus for preliminarily disintegrating are required which may be constructed in different ways depending on the nature of the product to be treated.

The advantages of the above mentioned method are as follows:

A bad effect on the flavor through a stifling of the product cannot occur as free access of the air to all the pairs of rollers is provided. Wet-grinding between rollers is made use of from which a higher degree of fineness results than from dry-grinding. The liquefying of the product is obtained through the melting of the grease contained in the product. The degree of liquidity of the molten grease can be regulated by influencing the temperature of the hollow or solid rollers respectively by means of a suitable medium for instance steam, water, electricity. By the use of rollers of suitable material the wear of these rollers is practically excluded. In contradistinction to the porcelain rollers and the triplex mills no stone- or porcelain dust spoils the product. Rollers made of suitable material such as chilled castings or steel will stand high pressures without cracking whereby a grinding to a higher degree of fineness is made possible than with grinding-cylinder mills in which the cylinders can only be slightly pressed against each other.

A device for carrying the method according to the invention into effect consists, for example, of a grinding cylinder mill with a plurality of cylinders or rollers made of hard material for instance chilled castings, steel, which mill is provided with a suitable feed hopper and an apparatus for preliminary disintegration. The latter may serve at the same time as a feed device in order to attain a good distribution of the material along the whole useful length of the rollers. As several pairs of rollers are required the rollers may be mounted in one common frame, and arranged at different levels and the adjacent rollers may be pressed against each other. Between every two of the rollers arranged in this manner a grinding passage is thus formed and to provide for three such passages four rollers are required. The material to be ground is fed to the uppermost pair of rollers so that the material falls into the subsequent grinding passages by its own weight. Portions of the material adhering to the rollers can be removed by scrapers and may fall off the latter. It may be seen from the foregoing that the single stages for carrying out the method may be effected in one machine, but for large outputs the various devices and passages may be arranged in several machines.

A constructional example on the lines mentioned above is shown on the accompanying drawings, in which—

Fig. 1 is a vertical cross-section of the device,

Fig. 2 a side elevation,

Fig. 3 is a front elevation partly shown in section,

Fig. 4 illustrates a detail of a device for influencing the temperature of the rollers.

Figure 1:
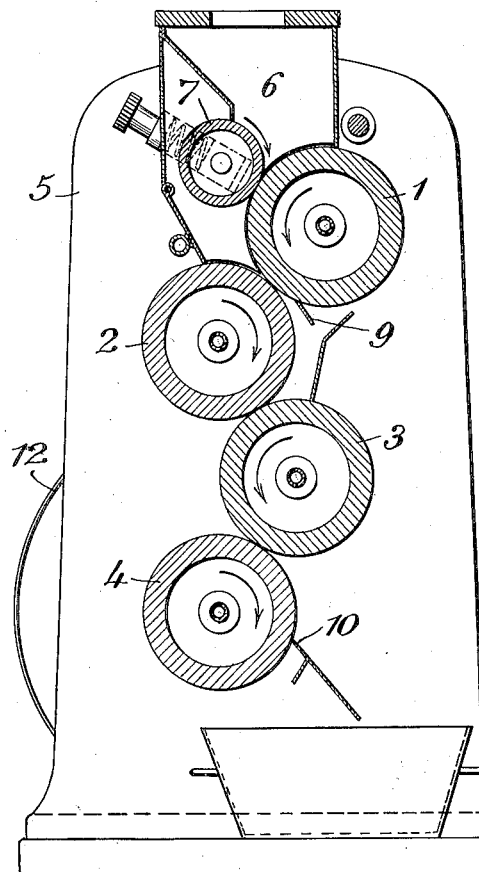
Figure 2:
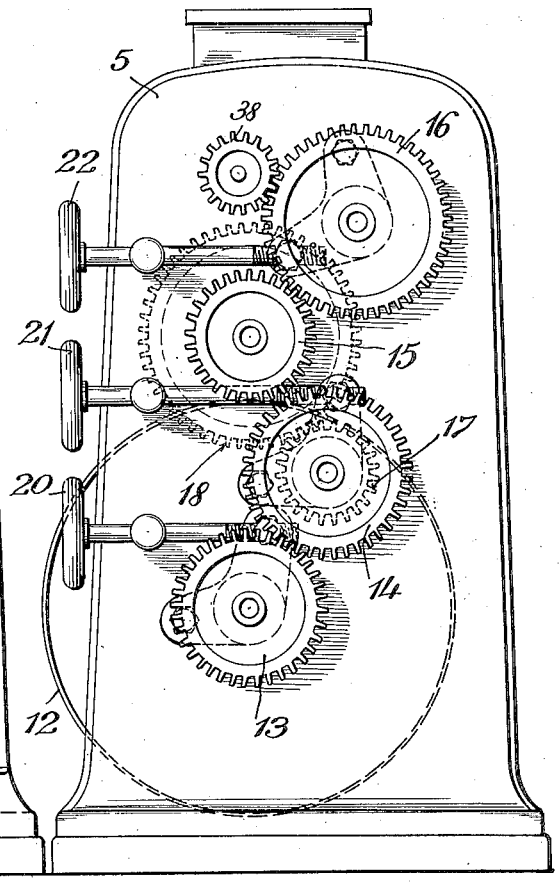

As is shown in Fig. 1, four rollers 1, 2, 3, 4 are arranged at different levels mounted in a frame 5. To the pair of rollers 1, 2 the material is fed from a hopper 6 provided with a device for the preliminary disintegration of the material. This device consists of two crushing or triturating rollers 1 and 7 rotating in opposite directions, one of these rollers (7) being mounted in a resilient manner, so that it can move away from the other roller when a larger piece of the material to be ground enters between the two rollers. By means of this resilient increase of the width of the grinding gap between the rollers 1 and 7 the gripping of larger granules is made possible which are then preliminarily disintegrated by the crushing and triturating action between the rollers 1 and 7 for the further treatment by grinding. The roller 7 mounted in a resilient manner may be very similar to the other grinding rollers proper with regard to its size, its manner of being driven, and its arrangement, nevertheless it has to be considered as the apparatus for carrying out the preliminary disintegration.

Figure 5:
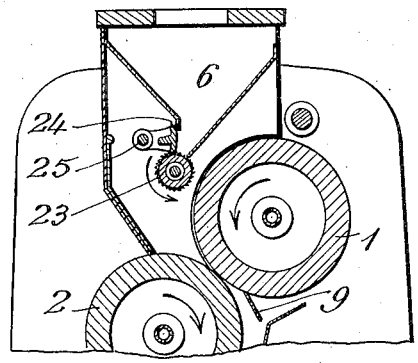
Fig. 5 shows a modification to a detail.

Another construction of the device for the preliminary disintegration illustrated in Fig. 5 consists of the following elements: A rotatable fluted roller 23 co-acts with a stationary edge 24 adjustable around an axle 25; the material is caused to pass between the roller 23 and the edge 24 is disintegrated to a desired size of the granules. The width of the gap between the edge 24 and the roller 23 can be adjusted and the size of the granules of the material corresponds to said width. The preliminarily disintegrated material passes into the nip of the rollers 1 and 2 and falls from there into the entrance angle between the rollers 2 and 3, a guide plate and a scraper 9 for removing flakes adhering to the roller 1 serve to collect the material and to guide it into the next passage. During the passage between the rollers 2 and 3 the material is ground to a liquid or semi-liquid product owing to the different circumferential speeds of the rollers 2 and 3, which product is then caused to pass between the rollers 3 and 4, a scraper may also be provided coacting with the roller 2. On passing between the rollers 3 and 4 the product is ground to a very high degree of fineness. A scraper 10 may be provided in connection with the roller 4. It is essential that provision is made for enabling the temperature of the rollers to be regulated as the liquefaction of the product varies in accordance with the percentage of grease contained in the product and with the melting point of the grease. A simple design of an arrangement for regulating the temperature of the rollers is shown in Fig. 4 illustrating a mode of supplying water or steam through the axles of the rollers. The rollers 1, 2, 3 and 4 are made hollow as well as the axles 31, 32, 33 and 34 of the said rollers and the medium for raising or lowering the temperature of the rollers is supplied by means of a pipe 35, into which a regulating valve 36 is inserted. The used medium flows outside the conduit 35 in the bore of the axle into a run-off 37. When starting the machine the rolls are cold and are heated with hot water or steam admitted through pipes 35. After a time, when normal operation is attained, the rolls heat automatically, the heating medium is cut off and a cooling medium, if necessary, is supplied through these pipes, as cold water, to remove some of the grinding heat, due to friction, and to maintain the product at the required temperature. Other modes of effecting the regulation of the temperature of the rollers may be used. Rotation is imparted to the rollers from a driving pulley 12 by the interposition of gear wheels 13—18 whereby suitable circumferential speeds are imparted to the various rollers that differ from each other. The pressure with which the adjacent rollers are pressed against each other may be adjusted by suitable devices operated by hand wheels 20, 21, 22. The device for effecting a variable pressure can be designed in many ways. The roller 7 of the preliminary disintegration device is driven from the gear wheel 16 with which a pinion 38 fixed to the axle 39 of the roller 7 coacts.

The device above described is provided with smooth rollers. It will be noted that in the particular construction illustrated, the power is applied by belt pulley 12 to the lowermost roll 4 which is geared by gear wheels 13 and 14 to the roll 3, next above. This roll 3 carries a driving pinion 17 at its opposite end that gears with a gear wheel 18 about twice its diameter on the next larger roll 2 and consequently drives it at a lower speed, about one-half the speed of roll 3. Roll 2 has a gear wheel 15 that gears with a larger wheel 16 (about the diameter of wheel 15) on roll 1, which is the slowest moving roll. The disintegrating or feed roll 7 which is much smaller than its co-operating roll 1, is driven by a pinion 38 at a circumferential speed approximately that of the circumferential speed of the roller 1, as there need not, as in the finer grinding, be a drawing action between the two rolls with consequent friction, but only a crushing action.

I claim:

1. The method of grinding grease-containing kernals and beans, which comprises passing the kernals or beans between successive co-operating rolls rotating at progressively increasing speeds sufficient to produce simultaneous heating, crushing and drawing action upon the material being ground, initially bringing the cold rolls up to operating temperature and maintaining a proper temperature of the product being ground to melt the grease contained in the product by cooling the rolls to remove the excess heat due to grinding.

2. The method of grinding alimentary kernals such as cocoa, almonds and the like, which comprises comminuting the kernals, passing the comminuted kernals between successive co-operating rolls adjustable one with respect to the other and rotating at progressively increasing speeds sufficient to produce a simultaneous heating, crushing and drawing action upon the product being ground and melt the grease contained therein, initially bringing the rolls up to proper operating temperature and regulating the melting heat produced during the drawing action of the rolls by regulating the pressure on the material as it passes through the rolls.

In testimony that I claim the foregoing as my invention, I have signed my name.

WERNER IFF.